Feb. 25, 1969   W. F. TAYLOR ET AL   3,429,656
EXHAUST GAS PURIFICATION
Filed Dec. 10, 1965
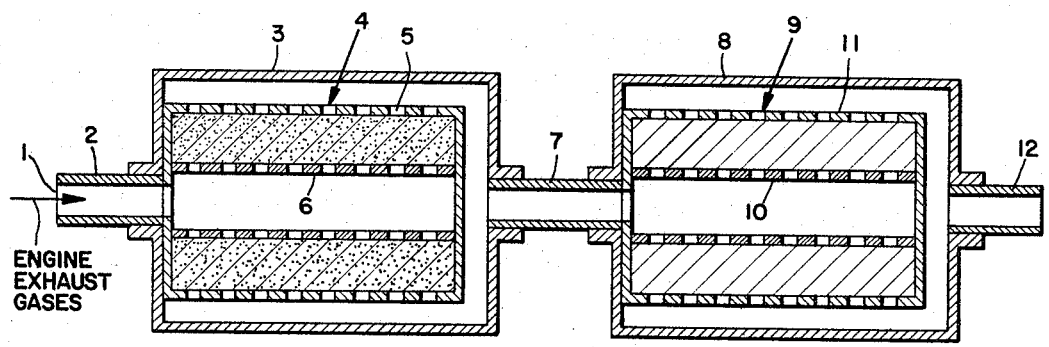
WILLIAM F. TAYLOR
JOHN H. SINFELT         INVENTORS
BY  Henry Berk
PATENT ATTORNEY

United States Patent Office 3,429,656
Patented Feb. 25, 1969

3,429,656
EXHAUST GAS PURIFICATION
William F. Taylor, Scotch Plains, and John H. Sinfelt, Berkeley Heights, N.J., assignors to Esso Research and Engineering Company
Filed Dec. 10, 1965, Ser. No. 512,875
U.S. Cl. 23—2
Int. Cl. B01d 53/34
6 Claims

ABSTRACT OF THE DISCLOSURE

Air pollutants are removed from exhaust gases by contacting the gases with a catalytic material containing metal oxides such as CuO, MnO, $V_2O_5$, etc., interspersed with alumina and sodium oxide. The preferred catalytic material additionally contains an adsorbent solid comprised of CaO and $Na_2O$ combined with $SiO_2$.

---

This invention is concerned with a purification treatment of gaseous products of fuel combustion, such as auto exhaust gases, for removal of poisonous components found difficult to remove hitherto by known oxidation or reduction procedures.

This invention deals with the preparation and use of sorptive and reactive solids, exemplified by calcium-sodium-silicate ($CaO$-$Na_2O$-$SiO_2$) compositions containing metal oxides (e.g., copper oxide) that are oxidative catalysts, as in the composition $$CuO-Na_2O-Al_2O_3/\text{kieselguhr}$$

These solid compositions are adapted for rapid removal of catalyst poisons, such as sulfur dioxide, with oxygen, from automotive engine exhaust gas as it leaves the engine at high flow rates. The solids are also adapted to retain the thus removed catalyst poisons in treating large volumes of the exhaust gas over a long period of time. Thus, these solid compositions are useful in an exhaust gas purification system for removing catalyst poisons from an exhaust gas which is then passed into contact with an equilibration-type catalyst capable of accomplishing further reaction of components such as unburned hydrocarbons and carbon monoxide with water and oxygen, and nitrogen oxides with $H_2$ and carbon monoxide, to convert these components into relatively innocuous components, such as $CH_4$, $H_2O$, $CO_2$, $H_2$, $N_2$, and $NH_3$.

With increasing need to control air pollution, a number of devices and chemical treating methods have been under development for treating exhaust gas. Most of the devices and treatments involve the use of an afterburner or a catalytic oxidation which require addition of air or oxygen and are not effective for the removal of the oxides of sulfur and nitrogen. The afterburning devices or catalytic means requiring air pumps are complicated and difficult to install in older cars. Some proposed treatments are merely filtering treatments with low capacity for removing and retaining poisonous components.

Combustion engine exhaust gases have to leave the engine exhaust ports at high velocities and varying temperatures. These gases contain a variety of components including $N_2$, $H_2O$, $CO_2$, CO, NO, $SO_2$, $O_2$, unburned hydrocarbons, lead compounds, organic and inorganic halides and in some instances still other components. The noxious polluting components which are of most concern are hydrocarbons higher boiling than methane, other organic gases, CO, nitrogen oxides, and $SO_2$.

An improved method for controlling the emission of hydrocarbons, organic compounds, CO, and nitrogen oxides is a catalytic gas equilibration process, which avoids addition of air or oxygen and does not result in excessive heat evolution, thus eliminating the need of air pumps or expensive heat resistant materials of construction. The catalytic equilibration process may employ an active Group VIII metal, preferably nickel or iron in a low-temperature steam reforming type catalyst which can convert the compounds by reaction with $H_2O$ present in the exhaust gas. The equilibration reactions which take place include the reaction of CO with $H_2O$ to form $CO_2$ and $H_2$, the reaction of NO with $H_2$ or CO to reduce the NO, and the reaction of hydrocarbons with $H_2O$ to form $CO_2$ and $H_2$.

Among the equilibration reactions which take place the following equations are considered to represent the more significant reactions:

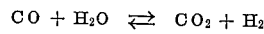

$$CO + H_2O \rightleftarrows CO_2 + H_2$$

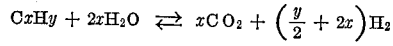

$$C_xH_y + 2xH_2O \rightleftarrows xCO_2 + \left(\frac{y}{2} + 2x\right)H_2$$

$$(x \geq 1; y = x \text{ to } 2x + 2)$$

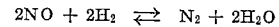

$$2NO + 2H_2 \rightleftarrows N_2 + 2H_2O$$

To be practical, the equilibration catalyst should have a long life, e.g., in excess of 150 hours to correspond to a half-year's service and preferably in excess of about 300 hours to amount to a year's service when an automobile is used in a customary manner.

A catalytic exhaust equilibration system is disclosed in U.S. application S.N. 325,024, filed Nov. 20, 1963. In such a system, nickel catalysts having high nickel surface area obtained by interspersion of nickel with alumina and promotion by certain components such as barium, are very attractive on account of their low cost and high activity for obtaining the desired equilibration reactions in treating exhaust gases.

The present invention provides a combined system for maintaining high equilibration catalyst activity by having the equilibration catalyst reaction zone preceded by a preconditioning zone containing a guard material which chemically reacts with components of the exhaust gas that deactivate the equilibration catalyst. For satisfactory functioning, the guard material should have good physical strength, high capacity for reacting with and removing poisonous components, resistance to degradation by moisture, and other properties.

A number of factors have to be considered in the preparation of a suitable guard material. The guard material must be sufficiently active to be effective in removing sulfur oxides from the exhaust gas at high space velocities, such as 500 v./v./hr. to 50,000 v./v./hr. (volumes gas per volume of catalyst per hour), at a temperatures in the range of 100° to 1500° F., to take into account variations of speed and temperature of an engine. The guard chamber for an automotive exhaust system has limits on its volume and weight. The guard materials have to be sufficiently hard and strong so as not to form dust and not offer too much resistance to the flow of gas at atmospheric pressure or slightly above atmospheric pressure. The cost of materials is another factor.

As disclosed in U.S. application S.N. 463,188 of W. F. Taylor et al., filed June 11, 1965, a suitable guard material, considering the factors mentioned, consists of a combination of 45 to 90 parts by weight of calcium as CaO, 5 to 30 parts by weight of $SiO_2$, and 5 to 25 parts by weight of sodium as $Na_2O$. In its preferred embodiment, this guard material contains the CaO, $SiO_2$ and $Na_2O$ as combined components in the following amounts by weight:

| | |
|---|---|
| CaO | 82 to 60 |
| $SiO_2$ | 8 to 20 |
| $Na_2O$ | 10 to 20 |

The ingredients supplying the calcium, sodium, and silica components are put together so that they are interspersed and combined or chemically bonded together as in simultaneous precipitation. This is followed by calcining of the precipitate and by extrusion or pelleting steps.

The calcium-sodium-silica solids thus formed have a high capacity for taking up and retaining the sulfur-containing components, which are mainly oxides of sulfur, whether they are used with or without other ingredients. These calcium-sodium-silica solids perform their function without addition of air to the exhaust gas treated. These solids may be mixed with spacing materials, e.g., asbestos fibers, without adding too much bulk.

In accordance with the present invention, the $CaO$-$Na_2O$-$SiO_2$ guard materials are made much more effective guard materials when used in association with certain oxidative catalytic materials represented by oxidative oxides of metals from the group consisting of Cu, Mn, V, Cr, Fe, Co, Ni, and Mo. The preferred metal oxides are CuO, MnO and $V_2O_5$. One or more of these metal oxides are effectively used in combination with alumina by co-precipitating a compound of the metal with aluminum cation by use of NaOH, or impregnating alumina with a compound of the metal and calcining to obtain the oxide of the metal interspersed with sodium and alumina or supported on alumina. The resulting metal oxide-$Na_2O$-$Al_2O_3$ mixtures are prepared to contain large amounts of the oxidative metal oxide, e.g., 5 to 60 wt. percent, and these materials can then be tested for their ability to remove the sulfur containing components from an exhaust gas or products of fuel combustion. At the same time they also can be tested for their ability to remove free molecular $O_2$ and CO from the gases. These tests correlate with the ability of these materials to enhance the effectiveness of the described $CaO$-$Na_2O$-$SiO_2$ guard materials when incorporated into or associated with said guard materials. These oxidative metal oxide-alumina mixtures by themselves function as guard materials but when used together with the $CaO$-$Na_2O$-$SiO_2$ materials, give unexpected improvements of large magnitude.

In general, the mass of preconditioning or guard material is to be arranged in a container or guard chamber which is attached to the exhaust conduit of an automotive engine in such a way as to insure that the hot exhaust gases have good contact with the preconditioning solid material with minimum flow resistance. The preconditioning material may be in the form of a bed preceding the equilibration catalyst or be in a preconditioning container connected with a container or chamber which contains the equilibration catalyst, so that the exhaust gases first contact the guard material, next contact the equilibration catalyst, and the resulting purified exhaust gas is thereafter released to the atmosphere.

The drawing illustrates schematically a combined preconditioning chamber and equilibration catalyst chamber.

Referring to the drawing, the exhaust gas leaving the engine, entering the combined system at inlet 1, flows through a duct 2 into the preconditioning container or guard chamber 3, in which is disposed a preconditioning solid cartridge 4 in the form of a cylinder having perforations 5 as ports for the treated gases. A perforated interior tube 6 distributes the gases entering from duct 2 so that the gases flow radially through the guard material solids packed between the outer cylinder 4 and the perforated tube 6. The cartridge may be connected by thread or friction engagement or otherwise with duct 2 so that it can be replaced when necessary. The outer container 3, which encloses the guard chamber, is connected by duct 7 to the container 8 in which is located a cartridge 9 that holds the equilibration or low-temperature steam reforming catalyst between perforated inner distributing tube 10 and the outer perforated cylinder 11 of the cartridge. This cartridge may be connected to the duct 7 so that it can be replaced when necessary. The equilibration chamber enclosed by container 8 has an outlet 12 for emitting the treated exhaust gas to the atmosphere.

The containers and cartridges described may have various forms and may be constructed for convenient replacement. The guard material and the equilibration catalyst may be placed as successive beds or layers in the same general container and arranged so that the gases pass through the guard material for preconditioning and then come into contact with the equilibration catalyst. In principle, the exhaust gas at varying temperatures in the range of about 100° to 1500° F. on leaving the engine exhaust port is made to flow into contact with the guard material that serves to remove poisoning components, such as principally $SO_2$ and $O_2$, and is then made to flow into contact with the equilibration catalyst for conversion of unburned hydrocarbons, carbon monoxide, and nitrogen oxides into the innocuous substances left in the purified exhaust gas and is then emitted into the atmosphere.

It is difficult to explain precisely how the guard material functions in removing certain components, such as the $SO_2$ from the exhaust gas. The suitable guard materials do not function simply as adsorptive materials or filters because highly adsorptive materials including molecular sieves are not suitable. The suitable guard materials do not function only as a base reacting with acidic components, because materials such as calcium oxide and materials high in alkali metal compound concentration are not suitable. Calcium oxide and calcium carbonate have limited capacity for reaction with $SO_2$ under exhaust gas conditions. Solids having a high concentration of alkali metal oxide or hydroxide are unsuitable on account of their low activity and tendency to form aqueous solutions with moisture in the exhaust gases. The alkaline earth and alkali metal compounds by themselves do not make suitable guard materials, since they exhibit low reactivity and retention of equilibration catalyst poisons and they do not have proper physical characteristics.

The preconditioning materials now found satisfactory for use in a guard chamber are typified by a combination of a major proportion of calcium and a minor proportion of silica and sodium in a combined form mixed with the oxidative metal oxides on alumina. The calcium-sodium-silica is expressed as being $CaO$-$Na_2O$-$SiO_2$ and during use of the material for removing the sulfur containing poisons from exhaust gas, these solids may have present carbonates, sulfates, hydroxides, and other compounds formed to various extents. The preconditioning solids are prepared by precipitating a calcium compound onto silica particles, e.g., kieselguhr, with an admixed alkali metal compound, washing soluble salts from the precipitated solids if desired, then drying and calcining the solids. The oxidative metal oxide-alumina solids are formed by coprecipitating the metals and aluminum cations with sodium hydroxide or impregnating the alumina with the metals which then are converted to the oxides by calcination.

The preconditioning solids may be ground into fine powders after drying, then mixed with a small quantity of water to improve extrusion characteristics. The solids are extruded or shaped into pellets or rods of about ¼ to ¹⁄₃₂ inch diameter and 0.1 to 1.0 inch length. Alternatively the solids may be dried to a predetermined water level, and then be extruded without the addition of water or liquid which forms a paste. Before or after forming the shaped solids, the solids may be washed with water to remove excess soluble alkaline metal, since alkali metal in excess has adverse effects in tending to pick up water and is also adverse to the activity of the guard material. Preferred methods of preparing the guard materials and tests demonstrating the effectiveness of guard materials are illustrated in the following examples:

Example 1

A calcium-sodium-silica preconditioning zone material was prepared by adding 850 g. $Ca(NO_3)_2 \cdot 4H_2O$ and 50 g. of kieselguhr to 3 liters of water, and stirring well. To this slurry was added 360 g. of NaOH over approximately a 1-hour period. After the addition of caustic was completed, the slurry was allowed to stir for an additional hour. The material was filtered, washed, and then dried overnight. It was then heated for 4 hour at 900° F. followed by 4 hours at 1250° F. The material was then crushed and screened to a 10/20 mesh size.

Example 2

The preconditioning zone material prepared in Example 1 was tested with a typical exhaust gas blend having the composition: 70.5 mole percent $N_2$, 14% $H_2O$, 10.5% $CO_2$, 3% CO, 1.2% $H_2$, 0.6% $O_2$, 0.12% nitric oxide, 600 p.p.m. butane, 600 p.p.m. butene, and 900 p.p.m. $SO_2$. The test was made by charging 40 cc. of the material weighing 17.8 g. to a tubular heated vessel. The typical exhaust gas blend was passed over the material at 900° F. and a space velocity of 2,500 v./v./hr. for a 4-hour period. Analysis of the gas effluent during the run, and of the dumped preconditioning zone material after the intensified test run, indicated approximately all of the entering $SO_2$ was removed.

Example 3

A calcium-sodium-silica preconditioning zone material was prepared in the same manner as in Example 1, except that after filtration and washing the material was dried and extruded into long cylindrical particles 1/16 inch in diameter and approximately ½ inch long. The material was then heated for 1 hour at 250° F. and 4 hours at 1250° F. In addition to the calcium and silica contained in the material, wet chemical analysis indicated it contained 8.1 wt. percent sodium.

With variations in the preparation of $CaO-Na_2O-SiO_2$ material and testing the solid products with a typical auto exhaust gas composition, determinations were made that the best pickup of sulfur is obtained when the guard material contains 82 to 60 parts by weight of calcium as CaO, 10 to 20 parts by weight of sodium as $Na_2O$ and 8 to 20 parts by weight of $SiO_2$. Other proportions could be present, e.g., 90 to 45 parts of CaO, 5 to 25 parts Na as $Na_2O$ and 5 to 30 parts $SiO_2$ to give useful guard protection. These guard materials give protection to an equilibration catalyst for periods in the range of 50 to 175 hours as shown by keeping the conversion of CO and of hydrocarbons that are higher in molecular weight than methane above 50% during two-thirds the entire period of operation. At the same time the nitric-oxide conversion was maintained above 98%.

The protective action of the guard material was clearly shown by the fact that in comparative tests with the same kind of equilibration catalyst the $CaO-Na_2O-SiO_2$ guard chamber material made the CO conversion and the hydrocarbon conversion higher after 175 hours than after only 40 hours with the equilibration catalyst that was not protected by the guard material when operating to treat a similar engine exhaust gas from the same engine at a comparable velocity and temperature.

In the comparative tests the nickel-bearing equilibration catalyst without a guard gave about 50% conversion of hydrocarbons and CO in typical automobile exhaust gases for no longer than 50 to 75 hours; but with a preceding guard of $CaO-Na_2O-SiO_2$ for removing $SO_2$, the catalyst gave above 50% conversion of these pollutants for 175 to 185 hours.

In accordance with the present invention, incorporation of an oxidation catalyst, e.g., CuO, into guard material markedly improved its performance for removing substances such as $SO_2$ which poison the nickel-bearing catalyst, so that in comparison to the foregoing tests, more than 50% of the pollutants, hydrocarbons and CO, were removed for longer than 300 hours from the same kind of typical automobile exhaust gases.

Only a small quantity of the metal oxide oxidation catalysts need be incorporated in the guard material, e.g., 0.2 to 2 wt. percent, to promote the effectiveness of the guard material in removing from exhaust gases catalyst poisons, particularly sulfur-, lead-, and halogen-containing substances, so as to improve the subsequent catalytic equilibration reaction of hydrocarbons, CO, and $H_2O$ components in the thus purified exhaust gases. Higher levels may also be used to give added improvement in performance.

The oxidation catalysts useful for promoting increased removal of sulfur oxides and other components poisonous to nickel are prepared by interspersing an oxide of a metal, e.g., an oxide of Cu or Mn, with alumina, or by impregnating vanadium compounds onto alumina. This can be done by coprecipitating manganese or copper with alumina onto silica or kieselguhr particles, using NaOH for precipitating the compounds from solutions of salts of such metals as shown in the following examples.

Example 4.—Preparation of copper-alumina material

To 3 liters of deionized water was added 298 g.

$$Al(NO_3)_3 \cdot 9H_2O$$

132 g. $Cu(NO_3)_2 \cdot 3H_2O$ and 20 g. of kieselguhr. The slurry was then stirred well. In a separate container 150 g. NaOH were dissolved in 500 cc. of deionized water. The NaOH solution was added while stirring to the slurry over an approximate 1-hour period. The resultant material was filtered, and dried overnight at 250° F. It was then extruded into 1/16" diameter material and calcined for 1½ hours at 250° F. followed by 4 hours at 1250° F. The finished material analyzed 9.4 wt. percent sodium. The calcined material has a composition represented by $$37\ CuO - 12\ Na_2O - 34\ Al_2O_3 / 17\ kieselguhr$$

Example 5.—Preparation of manganese-alumina material

To 3 liters of deionized water was added 298 g.

$$Al(NO_3)_3 \cdot 9H_2O$$

206 g. of 50% manganese nitrate solution and 20 g. of kieselguhr. The slurry was then stirred well. In a separate container 150 g. NaOH were dissolved in 500 cc. of deionized water. The NaOH solution was added to the slurry while stirring over an approximate 1-hour period. The resultant material was filtered, and dried overnight at 250° F. It was then extruded into 1/16" diameter material and calcined for 1½ hours at 1250° F. The finished material analyzed 5.9 wt. percent sodium. The calcined material has a composition represented by the formula:

$$38\ NnO - 8Na_2O - 36\ Al_2O_3 / 18\ kieselguhr$$

Tests have shown that oxidation catalysts which best promote the removal of $SO_2$ by calcium-sodium-silicate solids and function by themselves to remove sulfur are interspersed with alumina and deposited on a preformed material such as kieselguhr. Oxidative materials interspersed with silica and deposited on a preformed solid such as kieselguhr were found to be less effective. Representative test data is given in the following table:

TABLE I.—GUARD ACTION TESTS

[Auto exhaust gas blend containing 900 p.p.m. $SO_2$ treated at 900° F. and 2,500 v./v./hr. space velocity 4-hour test]

| Guard material | Ave. wt. percent sulfur on dumped material | Percent S removed from gas | Percent Conversion | |
|---|---|---|---|---|
| | | | $O_2$ | CO |
| (a) 34 CuO-18 $Na_2O$-30 $SiO_2$/18 kieselguhr | 1.41 | 45 | 20 | 0 |
| (b) 34 MnO-18 $Na_2O$-30 $SiO_2$/18 kieselguhr | 1.71 | 28 | 0 | 0 |
| (c) 38 MnO-8 $Na_2O$-36 $Al_2O_3$/18 kieselguhr | 4.04 | ~100 | 80 | 15-30 |
| (d) 37 CuO-12 $Na_2O$-34 $Al_2O_3$/17 kieselguhr | 4.51 | ~100 | 95 | 15-30 |

The data of Table I show that the best removal of $SO_2$ is accomplished with the oxidation catalysts containing alumina and that $SO_2$ removal is increased by reaction with free oxygen present in the gas. Only a small proportion of the CO in the gas is converted, thus leaving the gas in a reducing state, for more suitable subsequent treatment with an equilibration catalyst, e.g., a nickel-containing catalyst, or a water-gas shift catalyst, e.g., iron oxide-chromium oxide for conversion of CO to $CO_2$ and reduction of NO.

Further tests showed that the best oxidation catalysts are metal oxides of the group CuO and MnO, interspersed with alumina and sodium oxide, and $V_2O_5$ impregnated onto alumina.

The oxidation catalysts may be used in a zone, stage, or layer preceding the basic $CaO-Na_2O-SiO_2$ but direct incorporation of these catalysts in the basic guard material has been found to give superior results, apparently due to rapid removal of $SO_3$ as it is formed in the oxidation of $SO_2$.

The oxidatively promoted guard materials are prepared by mixing from 0.2 to 30 wt. percent of the metal oxide-alumina or metal oxide-alumina-silica in finely divided form with the basic $CaO-Na_2O-SiO_2$ material in finely divided form, then pelleting the resulting mixture. As the metal oxide in the alumina or alumina-silica carrier contains 5 to 60 wt. percent of the metal oxide oxidation catalyst, the basic material promoted with such catalyst should generally contain 0.01 to 18 wt. percent of the oxidative metal oxide, i.e., CuO, MnO, or $V_2O_5$.

The following examples illustrate the preparation of the promoted guard material and successful use of this material for protecting a nickel equilibration catalyst in treating exhaust gases.

Example 6.—CuO promoted guard material

The promoted guard material was prepared by mixing 10 parts of CuO catalyst with 90 parts of the basic guard material. The catalyst interspersed with carrier had the composition 37 CuO-12 $Na_2O$-34 $Al_2O_3$/17 kieselguhr and the basic guard material had the composition

Water was added to the mixture and it was extruded and calcined for 2 hours at 250° F. and 4 hours at 1250° F. to obtain the promoted guard material which was placed ahead of a nickel catalyst. The exhaust gas contained unburned iso-octane, 150 p.p.m. sulfur as $SO_2$, with the equivalent of 1.5 cc. tetraethyl lead per gallon of fuel and 1.0 theory of ethylene chloride and 0.5 theory of ethylene bromide scavenger agents. This exhaust gas was passed through the guard material then through the nickel equilibration catalyst. The temperatures rose to 750° F. and 900° F. at space velocities of 10,000 v./v./hr. The run was made for a period of up to 365 hours. For at least 238 hours substantially half the hydrocarbon was decomposed and over 60% of the carbon monoxide in the combustion gas was converted.

The use of the CuO catalyst incorporated into the basic guard material thus permitted the treating system to remove more than 50% of the CO for 300 hours which is equivalent to an average 1-year operation of the engine and to remove on an integral basis at least 70% of the hydrocarbon of higher molecular weight than $CH_4$ for a 1-year operation. The nitrogen oxides were at the same time eliminated from the treated exhaust gas by reduction.

A comparison of the oxidatively promoted guard material with a run using the same kind of guard material without the CuO oxidative catalyst showed that the performance with the catalyst was improved approximately 300%. The promoted guard material improved the performance of the equilibration treatment by over 1000% in protecting the nickel catalyst against poison. The improved performance was checked by using the promoted guard material ahead of a nickel catalyst in a cylindrical container attached to an 8 cylinder automobile engine exhaust pipe. The engine was operated with a high-grade gasoline containing 120 p.p.m. S, 2.9 cc. tetraethyl lead per gallon with the usual amount of ethylene halide scavengers. The engine was operated through cycles of idling, accelerating, cruising and decelerating, and these tests confirmed that the nickel catalyst was given improved protection by the guard material containing CuO to remove substances poisonous to the nickel.

Example 7.—$V_2O_5$ promoted guard material

A $V_2O_5$ catalyst containing 10% $V_2O_5$ impregnated onto alumina was added in finely divided form in an amount of 1 wt. percent to basic guard material having the composition 75 CaO-16 $Na_2O$-9 $SiO_2$. The materials were physically mixed as powders and the powder mixture was extruded to form pellets which were calcined for 1 hour at 250° F. and 12 hours at 1250° F. This material was tested for ability to remove large amounts of $SO_2$ from an exhaust gas mixture at 900° F. and space velocities starting at 2500 v./v./hr. The $V_2O_5$ promoted guard material improved the activity of the basic guard material by 15%.

The catalytic oxidizing materials by themselves or incorporated into the basic guard materials have been shown to be useful for obtaining rapid removal of sulfur dioxide from various combustion gases obtained from exhaust gases from the internal combustion engines or from fuel burners. Accordingly, these sulfur removing solids may be used in preventing air pollution by furnace flue gases as well as for preventing air pollution by internal combustion exhaust gases.

The invention described is claimed as follows:

1. In a process for treating exhaust gases from combustion of fuels for removal of air pollutants, said gases containing CO, unburned hydrocarbons, nitrogen oxides, sulfur oxides, $H_2O$, $CO_2$ and $O_2$, the improvement which comprises treating said exhaust gases by contact with a catalytic material containing a catalytic metal oxide of the group consisting of oxidative oxides of Cu, Mn, V, Fe, Co, Ni, and Mo interspersed with alumina and $Na_2O$ on siliceous particles for removal of $O_2$ and sulfur oxides from said gases, wherein the amount of said catalytic metal oxide is within the range between about 5% and 60% by weight, said catalytic material being incorporated as a minor ingredient in an adsorptive solid containing 45–90 parts by weight CaO combined with 5–25 parts by weight $Na_2O$ and 5–30 parts by weight $SiO_2$.

2. In a process as set forth in claim 1, where said oxidative oxides are preferably selected from the group consisting of CuO, MnO and $V_2O_5$.

3. In a process set forth in claim 1, said adsorptive solid containing 60 to 82 parts by weight CaO combined with 10 to 20 parts by weight $Na_2O$ and 8 to 20 parts by weight $SiO_2$.

4. In a process set forth in claim 1, said gases after removal of $O_2$ and sulfur oxides being contacted with a catalyst which makes CO react with $H_2O$ to form $CO_2$ and $H_2$, reduces nitrogen oxides to form $N_2$ and promotes reaction of said hydrocarbons with $H_2O$ to form $CO_2$ and $H_2$.

5. In an exhaust gas purification system for removing air pollutants from exhaust gas conducted in a flow path from an internal combustion engine to the atmosphere, said exhaust gas containing CO, unburned hydrocarbons, nitrogen oxides, sulfur oxides, $H_2O$, $CO_2$ and $O_2$ from fuel combustion in the engine,
(A) a bed of preconditioning solids in said flow path for removal of sulfur oxides and $O_2$ from the exhaust gas contacted with said solids comprising on siliceous particles a catalytic oxide of a metal from the group copper, manganese, and vanadium interspersed and combined with oxides of aluminum and of sodium, said catalytic metal oxide being present in an amount within the range between about 5 and 60% by weight,
(B) a bed of particles containing a low-temperature steam-reforming catalyst located down-stream from the preconditioning solid in said flow path to promote reaction of the CO and hydrocarbons with the $H_2O$ to form $CO_2$ and $H_2$, and promote reaction of nitrogen oxides with $H_2$ in the exhaust gas flowing past the preconditioning solids with the sulfur oxides and $O_2$ removed.

6. In the system defined by claim 5, said preconditioning solids comprising adsorbent solids containing 45 to 90 parts by weight CaO and 5 to 25 parts by weight $Na_2O$ combined with 5 to 30 parts by weight silica and the steam-reforming catalyst containing a metal from group nickel and iron.

References Cited

UNITED STATES PATENTS

| | | | |
|---|---|---|---|
| 2,423,688 | 7/1947 | Day | 252—192 |
| 3,067,002 | 12/1962 | Reid | 23—2 |
| 3,249,558 | 5/1966 | Kearby | 23—2 X |

OSCAR R. VERTIZ, *Primary Examiner.*

A. J. GREIF, *Assistant Examiner.*

U.S. Cl. X.R.

23—288; 252—192, 454